Nov. 13, 1962     C. A. DUKES, JR     3,063,163
TRANSPARENT OVERLAY SHELLS FOR TERRESTRIAL GLOBES
Filed Oct. 12, 1961
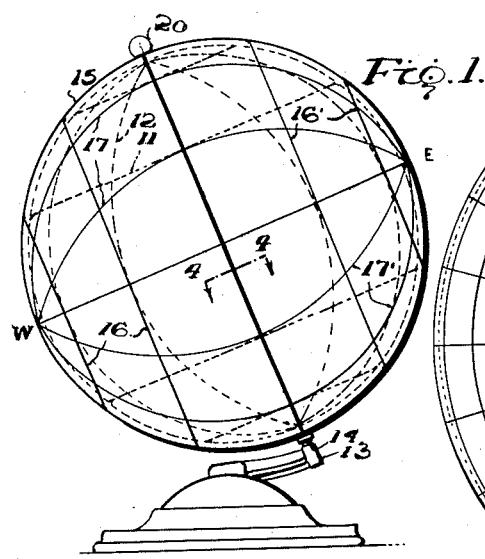
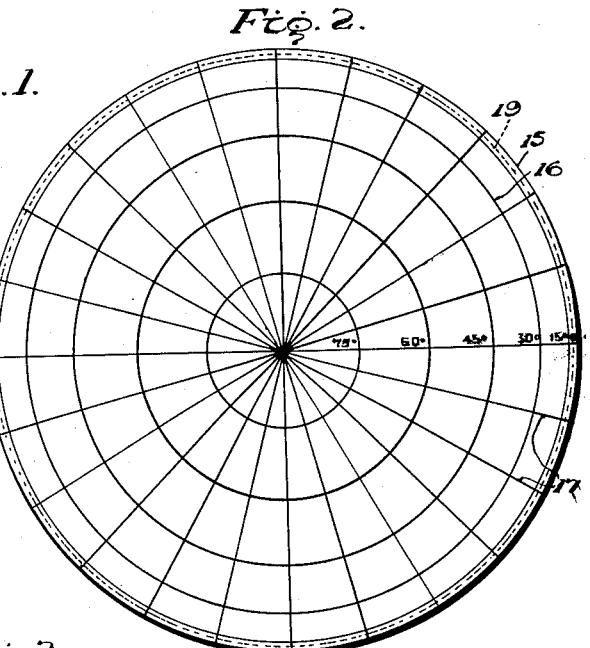
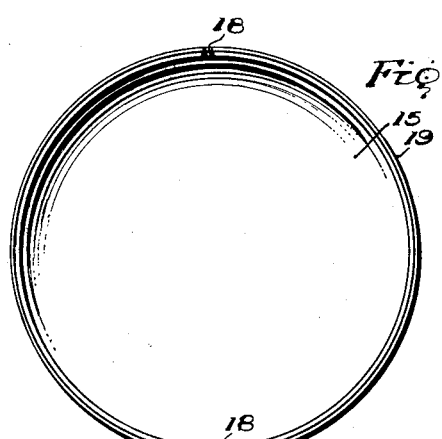
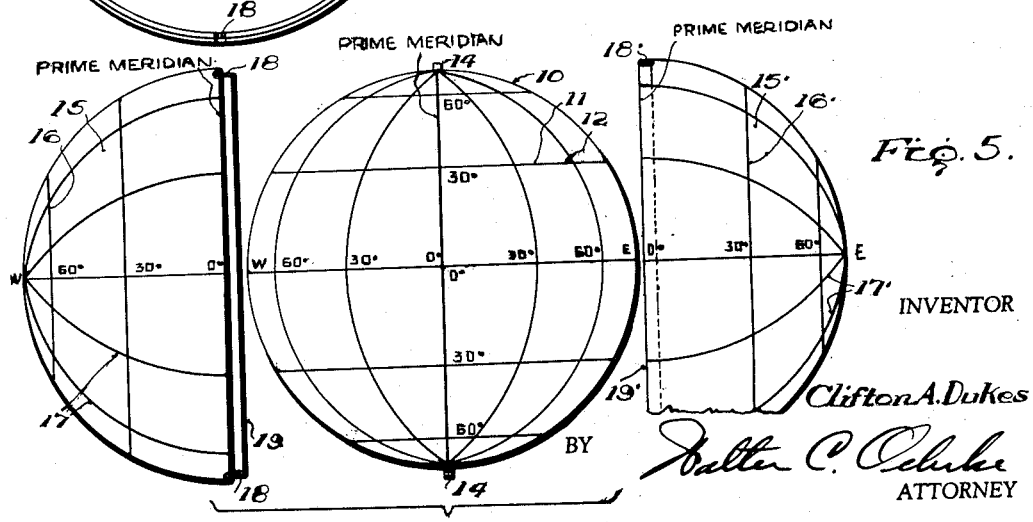
INVENTOR
Clifton A. Dukes
BY
ATTORNEY

United States Patent Office 3,063,163
Patented Nov. 13, 1962

3,063,163
TRANSPARENT OVERLAY SHELLS FOR
TERRESTRIAL GLOBES
Clifton A. Dukes, Jr., 2512 Alston Drive SE.,
Atlanta 17, Ga.
Filed Oct. 12, 1961, Ser. No. 144,800
2 Claims. (Cl. 35—46)
(Granted under Title 35, U.S. Code (1952), sec. 266)

The invention described herein, if patented, may be manufactured and used by or for the Government for governmental purposes, without the payment to me of any royalty thereon.

This invention comprises a three-dimensional overlay system for a terrestrial globe and more particularly concerns a pair of mating hollow transparent hemispheres, carrying geographical coordinates (parallels and meridians) at right angles to the regular coordinate system of the globe, for a purpose about to be explained.

The conventional system of defining a geographical locus on the surface of the earth is by reference to its geographical latitude and longitude. Latitude is determined by a series of 90 parallels north of the Equator, and 90 parallels south of the Equator. Longitude is customarily determined by 180 meridians east of the prime meridian (0°) longitude, and 180 meridians west of the prime meridian (0°). All meridians run from North Pole to South Pole.

This system has a number of advantages to the navigator, but lends itself poorly to the determination of geographical loci for use in automatic data processing systems, as for instance, the plotting of nuclear explosions by optical observation and measuring systems connected to automatic data plotters, inasmuch as these systems cannot be readily adapted to a dual coordinate system of a series of parallels of gradually decreasing circumferences and a series of meridians of equal length. It is therefore desirable to provide an additional coordinate system, wherein there are provided two series of parallel circles running parallel to the full circle defined by the prime meridian (0°) and 180° meridian. These parallel circles gradually decrease in size until they shrink to a point at 90° east longitude, 0° latitude, and again at 90° west longitude, 0° latitude. An auxiliary system of 360 "meridians of latitude" running from 0° latitude 90° east longitude, to 0° latitude 90° west longitude and at right spherical angles to the conventional north-south meridian system is also provided for cooperation with the just-described new north-south parallel system. Such a geographical coordinate system is easy to program for automatic data processing systems, as all geographic processing data are expressed by reference to parallel circles (conventional parallels of latitude, and the new parallels of longitude). It is also feasible to program for the automatic conversion of conventional degrees of longitude (expressed in conventional meridians) to degrees of longitude expressed in north-south parallels for any given geographical locus.

In order to visualize this new geographical coordinate system and to enable plotting of loci of nuclear explosions and other geographical point data on a terrestrial globe, there is provided a three-dimensional overlay system, whose objects, advantages and construction details are set forth in this specification and accompanying drawings.

In the drawings which set forth a preferred mode of carrying my invention into practice, without, however, limiting the scope of the invention to the structural details set forth therein, FIGURE 1 represents a side elevational view of a terrestrial globe, carrying the novel overlay system;

FIGURE 2 is a front elevational view of one of the two overlay shells for use in this system;

FIGURE 3 is a rear elevational view, corresponding to FIGURE 2, but on a reduced scale and omitting the indicia;

FIGURE 4 is an enlarged detailed sectional view of the joint of the two overlay shells, taken along the line 4—4 of FIGURE 1; and FIGURE 5 is a diagrammatical exploded view of the combination of FIGURE 1, but shown without a parallax angle.

More particularly, reference numeral 10 denotes a conventional spherical terrestrial globe, carrying the conventional coordinate system indicia (parallels of latitude 11 and meridians of longitude 12). This sphere is shown mounted on a stand 13 which carries a rod 14 representing the earth axis, at a parallax angle of 23° 27'; this angle may be ignored, if considered irrelevant to plotting.

Interfitting with sphere 10 is a pair of mating hollow transparent hemispheres 15, 15', whose inner radius is equal to the radius of the spherical globe. Each of these hemispheres carries a series of parallels 16 and 16' respectively, of gradually diminishing radii, and finally becoming a point at the extremity of each shell, i.e., at the point on its maximum curvature. Also, each shell carries a series of intersecting halved great circles 17 and 17', respectively, running from the base of the shell through the last-mentioned point to an opposite locus on the base of the shell, and representing "meridians of latitude." The shells are fitted over the globe, and come together at the prime meridian (or less desirably, at another pre-selected conventional meridian of longitude inscribed on the globe). Small semi-circular cut-outs 18, 18' are provided at opposite locations on the base of each shell to accommodate rod 14. The mating of the spheres is preferably effected by an interfitting tongue and groove arrangement of flanges 19, 19' at the bases of shells; other means may be substituted therefor, including even circumferential strips of transparent pressure-sensitive adhesive tape (not shown).

Any suitable rigid or semi-rigid transparent material may be chosen for the overlay shells, e.g., polymethylmethacrylate, polystyrene, or other synthetic plastics material, or (less preferably) glass, etc. The indicia on the overlay shell may be etched and/or lacquered, or otherwise placed thereon in permanently visible form so as to withstand repeated cleaning off of the surface of the overlay shells. Indicia may be placed either on the outside or on the inside of each overlay shell. The color of the parallels 16, 16' and portions of great circles 17, 17' on overlay shells 15, 15' should be of a color contrasting with the color of the coordinate system on the globe 10; e.g., the indicia on the overlay shells may be red, when the coordinate system on the globe is blue or black. Preferably, the shells should be sufficiently thin to enable their placement on a conventional globe by manipulation of a fastening nut 20 or equivalent fastening means.

It will thus be seen that I have provided a practical three-dimensional overlay shell system for terrestrial globes, which makes it possible to define any given locus on the globe either by the conventional coordinate system or by a novel system wherein the conventional meridians of longitude are replaced by parallels of latitude (and wherein interpolations are made possible by a system of halved great circles running from east to west).

Changes and permutations of the construction, as described herein, will readily occur to the expert, as for instance, a pair of hemispheric shells which meet at a great circle that does not coincide with the prime or other meridian of the globe. Such changes and departures are deemed within the scope and spirit of my invention and within the compass of the appended claims, by which I now proceed to define my invention.

I claim:

1. In combination with a terrestrial globe carrying the usual indicia of a geographic coordinate system of north-south meridian semi-circles, equator, and conventional parallel circles: a pair of mating hollow transparent hemispheres removably overlying said globe and having an inner radius equal to the radius of the surface of said globe, said hemispheres carrying indicia of a geographic coordinate system of two series of parallel circles of progressively diminishing diameters and running parallel to the prime meridian of said globe coordinate system, and of a series of great circles coinciding at two opposite points on the equator of said globe, said indicia on said hollow transparent hemispheres being of a color contrasting with the color of the coordinate system indicia carried by said terrestrial globe; whereby the position of any geographical location on said terrestrial globe is identified by coordinates of either system, and whereby the coordinates of either system are readily identified by the color of their indicia, in contrast to the color of the indicia of the other coordinate system.

2. In combination with a terrestrial globe carrying the usual indicia of a geographic coordinate system of north-south meridian semi-circles, equator, and conventional parallel circles, said globe being mounted on a stand carrying a rod representing the earth's axis: a pair of hollow transparent hemispheres removably overlying said globe and having an inner radius equal to the radius of the surface of said globe, said hemispheres carrying indicia of a geographic coordinate system of two series of parallel circles of progressively diminishing diameters and running parallel to the prime meridian of said globe coordinate system, and of a series of great circles coinciding at two opposite points on the equator of said globe, said indicia on said hollow transparent hemispheres being of a color contrasting with the color of the coordinate system indicia carried by said terrestrial globe, whereby the position of any geographical location on said terrestrial globe is identified by coordinates of either system, and whereby the coordinates of either system are readily identified by the color of their indicia in contrast to the color of the indicia of the other coordinate system; said transparent hemispheres mating along a circular line coinciding with a meridian of said globe, to facilitate placement of said transparent hemispheres over said globe in aligned relationship therewith, and to facilitate removal of said transparent hemispheres from said globe, without removing said globe from its stand.

References Cited in the file of this patent
UNITED STATES PATENTS

| | | |
|---|---|---|
| 1,928,025 | McEwan | Sept. 26, 1933 |
| 2,985,969 | Farquhar | May 30, 1961 |
| 3,016,629 | Case | Jan. 16, 1962 |
| 3,037,300 | Grosser | June 5, 1962 |